United States Patent [19]
Arnold et al.

[11] 3,788,045
[45] Jan. 29, 1974

[54] GAS CLEANING APPARATUS

[75] Inventors: Orlan M. Arnold, Grosse Pointe Park, Mich.; Carlo A. Vancini, Stamford, Conn.

[73] Assignee: Peabody Engineering Corporation, New York, N.Y.

[22] Filed: Sept. 13, 1971

[21] Appl. No.: 179,910

[52] U.S. Cl.............. 55/238, 55/230, 55/416, 55/449, 55/456, 55/461, 261/79 A
[51] Int. Cl............................. B01d 47/06
[58] Field of Search . 55/92, 94, 223, 230, 235–239, 55/257, 258, 260, 456, 416, 457, 461; 261/79 A

[56] References Cited
UNITED STATES PATENTS

| | | | |
|---|---|---|---|
| 1,846,248 | 2/1932 | Clarke | 261/79 A |
| 1,983,762 | 12/1934 | Kotzebue | 261/79 A |
| 3,399,870 | 9/1968 | Zuiderweg et al. | 261/114 |
| 3,345,046 | 10/1967 | Versluys et al. | 261/79 A |
| 3,524,302 | 8/1970 | Jalma | 261/79 A |
| 2,763,245 | 9/1956 | Place | 122/488 |

FOREIGN PATENTS OR APPLICATIONS

| | | | |
|---|---|---|---|
| 519,511 | 12/1955 | Canada | 55/348 |
| 1,242,721 | 8/1960 | France | 261/79 A |
| 26,460 | 8/1902 | Switzerland | 261/115 |

*Primary Examiner*—Bernard Nozick
*Attorney, Agent, or Firm*—N. L. Leek & Robert H. Bachman

[57] ABSTRACT

Gas cleaning apparatus having at least two stages. In the first stage the gas is passed through a liquid spray for removing particulate material. In the second stage any remaining particulate matter or droplets are removed. The stages involve combinations of slotted baffles with deflectors for stripping the gas and bonnet units with concentric passages for reversal of flow for removing particulate matter by centrifugal action and by impingement.

12 Claims, 8 Drawing Figures

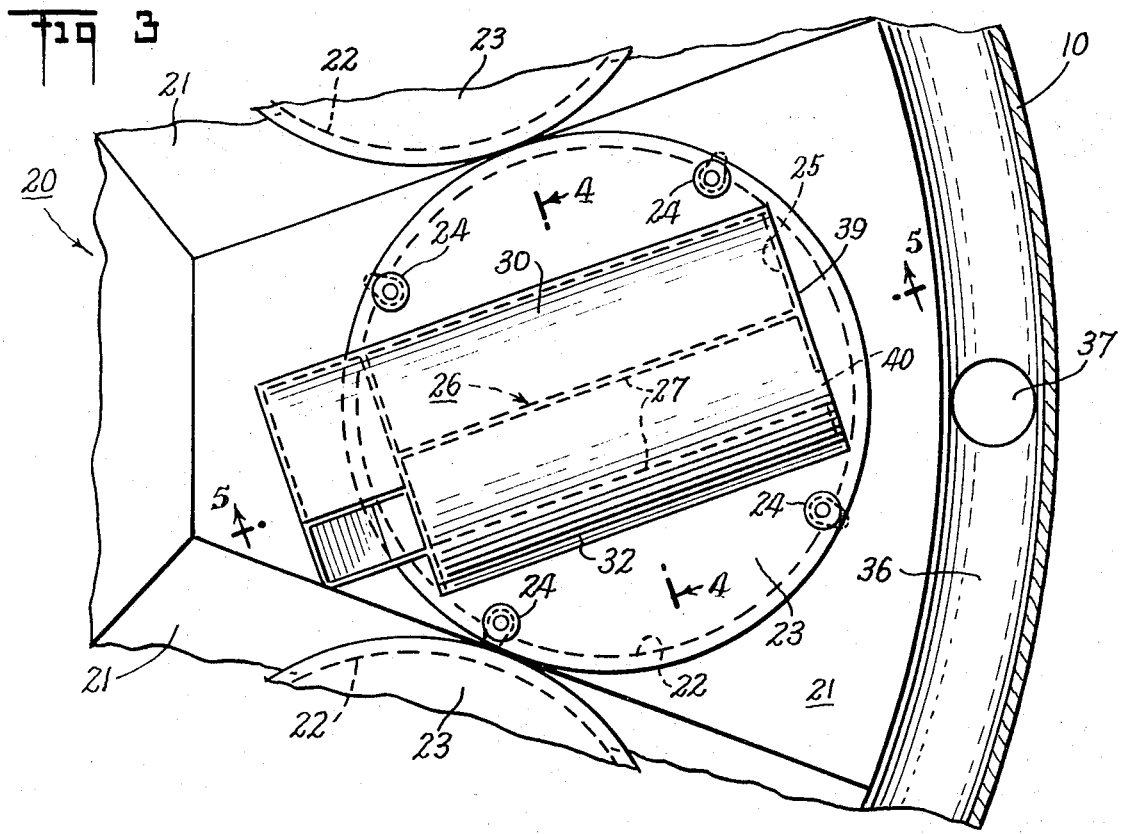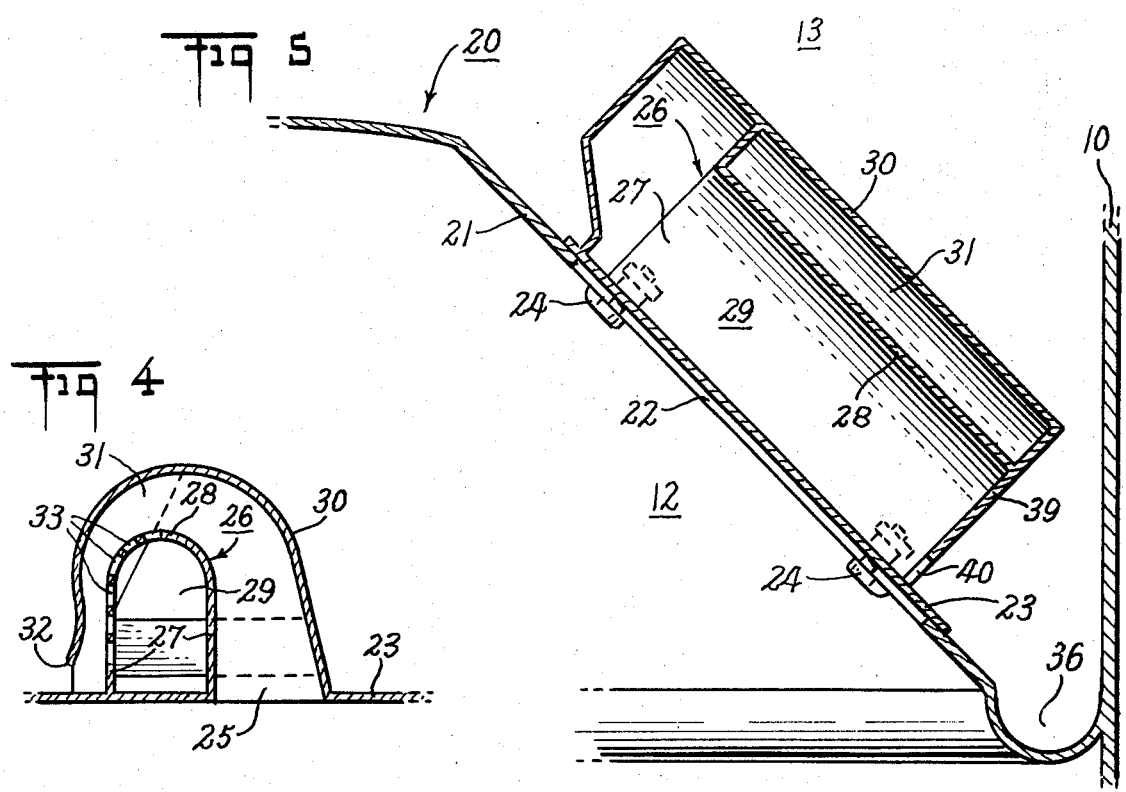

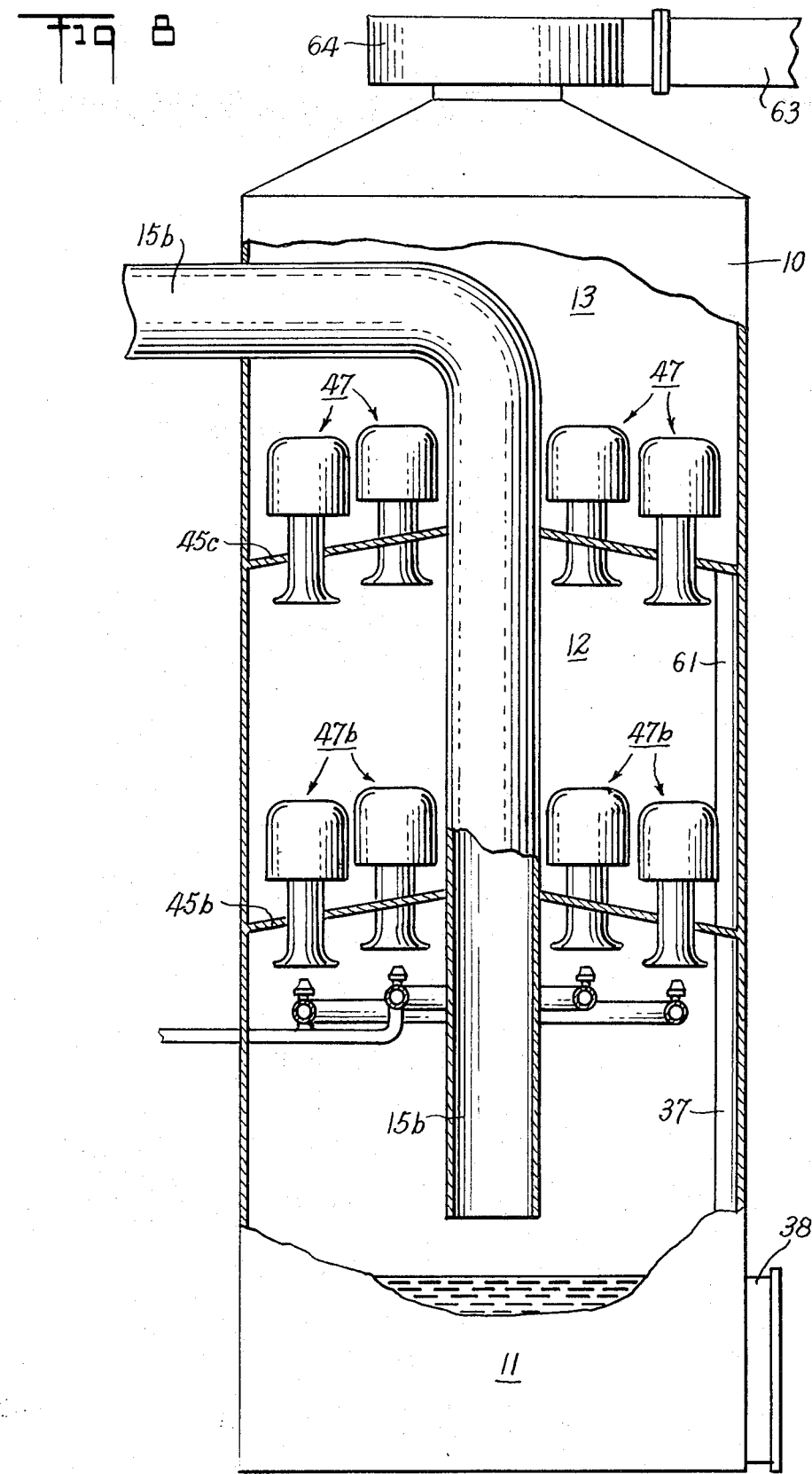

GAS CLEANING APPARATUS

This invention relates to gas cleaning apparatus and more particularly to apparatus having two or more stages wherein the gas is first washed and then dried to remove the wash liquid.

An object of this invention is to provide improved and efficient apparatus for the above purpose.

Another object is to provide such a unit wherein the number and arrangement of the parts may be varied or adjusted to meet specific requirements.

Another object is to provide an apparatus of the above type which utilizes the kinetic energy of the liquid spray and the velocity of the gas flow for the stripping operation.

Another object is to provide such an apparatus wherein the pressure drop is reduced to a minimum.

Various other and specific objects will be apparent as the invention is more fully disclosed.

In accordance with the invention, the apparatus includes a shell along which the gases pass having a plurality of transverse baffles with openings for the passage of the gas and adapted to drain the removed particulate matter and liquid into a reservoir in the lower part of the shell. The initial baffle or baffles may constitute wash stages and the remaining baffle or baffles may constitute drying stages.

One or more of the baffles may have a series of slots for the passage of the gases provided with arcuate deflectors and channel members forming constricted arcuate passages in which the major portion of the liquid and particulate material is removed by centrifugal force while the gases pass to the next stage. In a washing stage the gases pass through a liquid spray before entering the slots in the baffle plate.

Other stages may include units of the bonnet type having concentric passages for the flow of gases with reversal in direction and rotation for removing the droplets by centrifugal force and by the inertia of the particles. These units may be in the drying stage or in the wash stage. In the latter case a liquid spray is introduced below the baffle plate for washing purposes.

The nature of the invention will be better understood from the following description, taken in connection with the accompanying drawings in which certain specific embodiments have been set forth for purposes of illustration.

In the drawings:

FIG. 3 is a detail of one of the slotted units;

FIG. 4 is a transverse section taken on the line 4—4 of FIG. 3;

FIG. 5 is a longitudinal section taken on the line 5—5 of FIG. 3;

FIG. 8 is a similar vertical section illustrating a still further embodiment.

Figure 1:
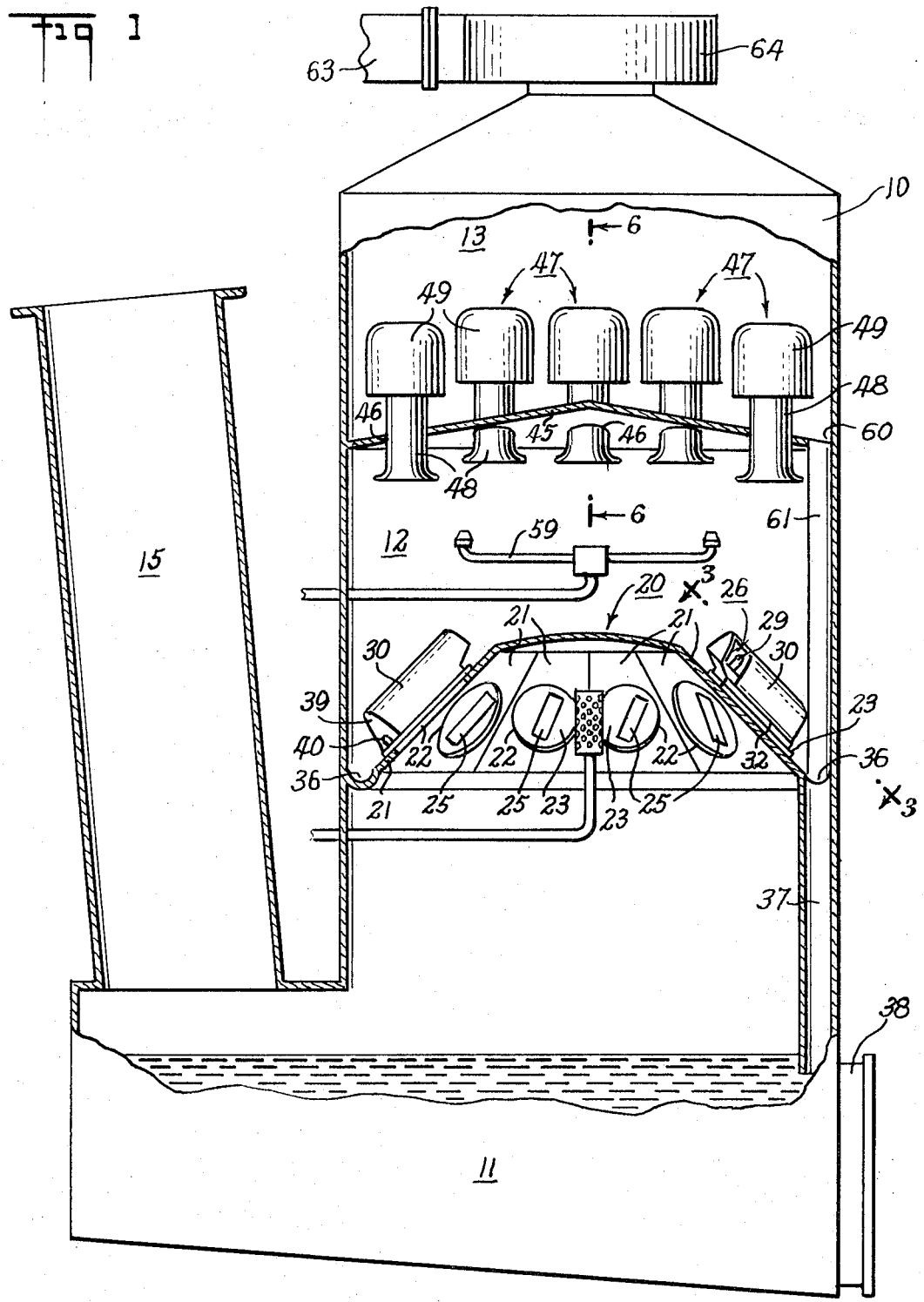
FIG. 1 is a vertical section through a gas cleaning apparatus embodying the invention.
Figure 2:
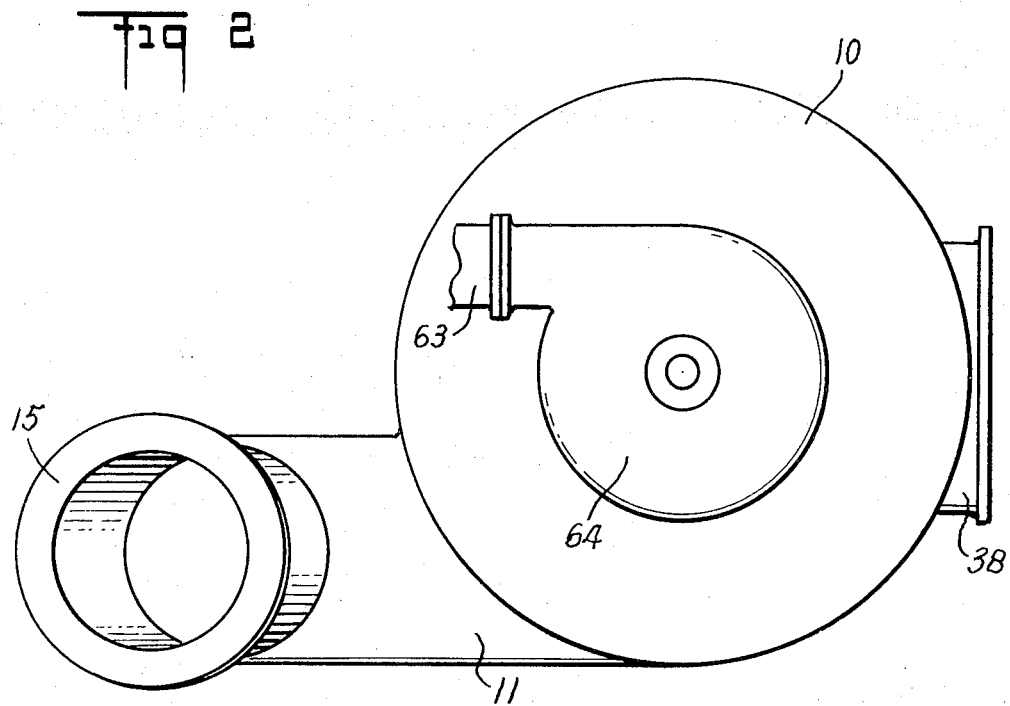
FIG. 2 is a top plan view thereof.

Referring to the drawings in more detail, FIG. 1 shows an outer shell 10 forming a vessel which houses the apparatus. This shell encloses a lower reservoir portion 11, an intermediate washing zone 12 and an upper drying zone 13. An inlet duct 15 is positioned to introduce the gases for treatment tangentially into the shell 10 above the reservoir section 11 and into the washing zone 12. The tangential inlet causes the gases to rotate in the washing and drying zones for producing a uniform distribution and treatment as the gases pass through the washing and drying zones.

The washing zone 12 includes a transverse baffle 20 which is shown as a truncated cone having flat trapezoidal sides 21 disposed therearound. Each of the sides 21 has a circular opening 22 in which a separator unit including a disc 23 is secured in adjustable angular positions by clamps 24 (see FIGS. 3 and 5).

The disc 23 as shown in FIGS. 3, 4 and 5, has an elongated slot 25 through which the gases pass. On one side of the slot 25 is an inverted channel member 26 having side walls 27 and a rounded top surface 28 forming an open ended channel 29 therein.

An arcuate deflector plate 30 is disposed on the side of the slot 25 opposite the channel member 26 and extends around the latter member to form an arcuate passage 31 of decreasing cross sectional area with its free edge 32 disposed above the surface of the disc 23 so as to cause liquid drops and particulate material which has impinged on the inner surface of the deflector due to centrifugal force to drop onto the disc 23 while the gases on the inner portion of the arcuate passage 31 are stripped through holes 33 on one of the sides 27 of the channel member 26 and flow into the zone above the disc 23. The remaining portions of the gases pass under the free edge 32 of the deflector plate 30 into the same zone. The change in direction of these latter gases as they impinge on the plate 21 further strips the particulate material therefrom.

For washing the gases as they pass into the slots 25 a fixed spray 35 is disposed below the baffle plate 20 and is adapted to eject a uniform curtain of spray around its entire periphery and across the various slots 25. This spray has the usual washing effect and serves to remove or agglomerate entrained droplets or particulate matter.

The baffle plate 20 is provided at its periphery with a channel 36 which collects the liquid and particulate material which has been stripped from the gases by the units above described. This liquid is drained by drain pipe 37 into the reservoir portion 11 from which it is removed by suitable means, not shown, through discharge opening 38, which may be connected to a drainage pipe or separator, not shown.

The lower end of each channel member 26 may be closed by an end portion 39 if desired having a drainage opening 40. The slots 25 have been shown as extending at an angle to the radius of the plate 20 and arranged so that the discharge portion under the free edge of the deflector is on the downward sloping side to facilitate the flow toward the periphery of the plate 20. This angle can be adjusted by loosening the clamps 24 and rotating the disc 23 in the opening 22. It is obvious, however, that if this adjustment is not required the slots may be made directly in the plates 21 and the circular discs may be omitted. Also the baffle plate 20 may be circular in section instead of segmental with flat portions as shown. The angle of the sloping sides may also be varied according to the nature of the material to be removed. In some instances a plurality of baffle plates of similar construction may be stacked one above the other in the washing zone if required for washing and cleaning purposes.

Figure 6:
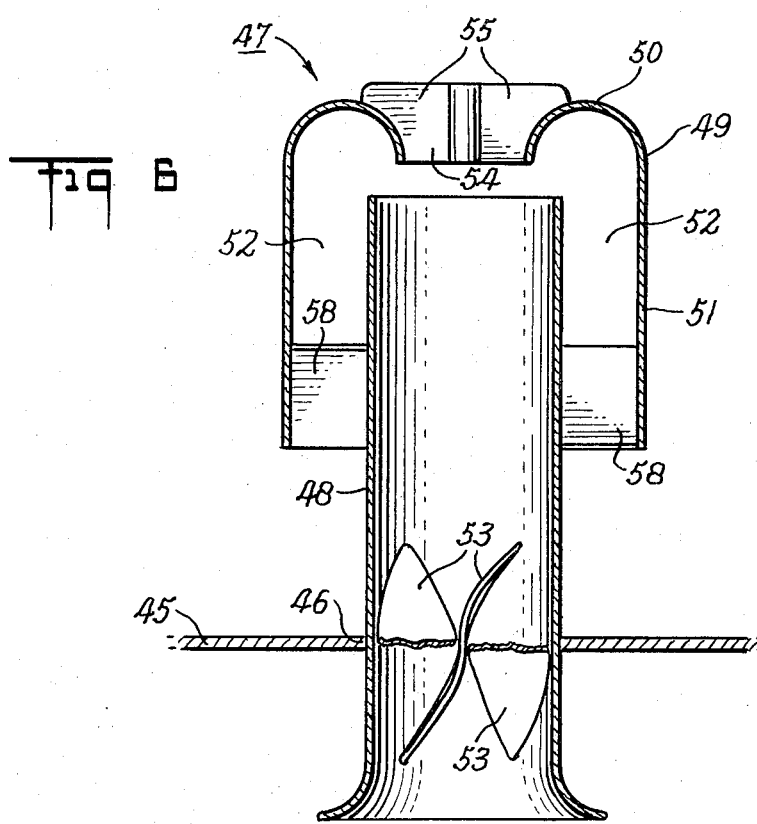
FIG. 6 is a section through a bonnet type unit.

The drying zone in FIG. 1 includes a transverse baffle plate 45 having a series of openings 46 carrying drying and separator units 47 of the bonnet type. Each unit 47, as shown in FIG. 6, includes an inner cylinder 48 which extends into and is secured in the opening 46 and carries a cap 49 having an arcuate top portion 50 and a depending skirt portion 51 which extends downwardly around the cylinder 48 to form an annular gas passage 52. A series of vanes 53 is disposed in the lower end of the cylinder 48 to cause rotation of the gases passing upwardly in the cylinder. The rotation of the gases causes any remaining droplets or particulate matter to be concentrated in the outer peripheral portions of the gas stream. The axial portion of this gas stream passes through an axial opening 54 in the top portion 50 of the cap 49. A set of vanes 55 may be disposed in this axial opening 54 to decrease or remove the rotation of the gases passing therethrough.

The outer portion of the rotating gas stream is stripped from the portion passing through the axial opening 54 and impinges on the lower arcuate surface of the cap by which it is deflected and reversed in direction to pass downwardly through the annular passage 52. During such passage the heavier matter to be removed impinges on the surface of the skirt 51 and drains downwardly onto the plate 45. The gases also have a second reversal in direction as they impinge on the plate 45 with the removal of further quantities of entrained matter. A third set of vanes 58 is disposed at the exit end of the channel 52 for decreasing or interrupting the rotation of the discharged gases.

A reaction type rotary spray 59 is disposed below the baffle plate 45 for use in cleaning the under surface of the plate. This spray also drains onto the upper surface of the plate 20 and assists in washing the particulate matter into the peripheral channel 36.

The baffle plate 45 may also be slightly conical with a peripheral channel 60 into which the separated matter is collected and drained by a drain pipe 61 into the reservoir 11. The drainage pipes 37 and 61 extend into the liquid in the reservoir to form a liquid seal.

It is to be understood that a series of such drying plates may be stacked, if necessary, for further drying the gases. The washed and dried gases are passed into a discharge duct 63 by means of a suction fan 64 which is adapted to cause the required pressure drop.

Figure 7:
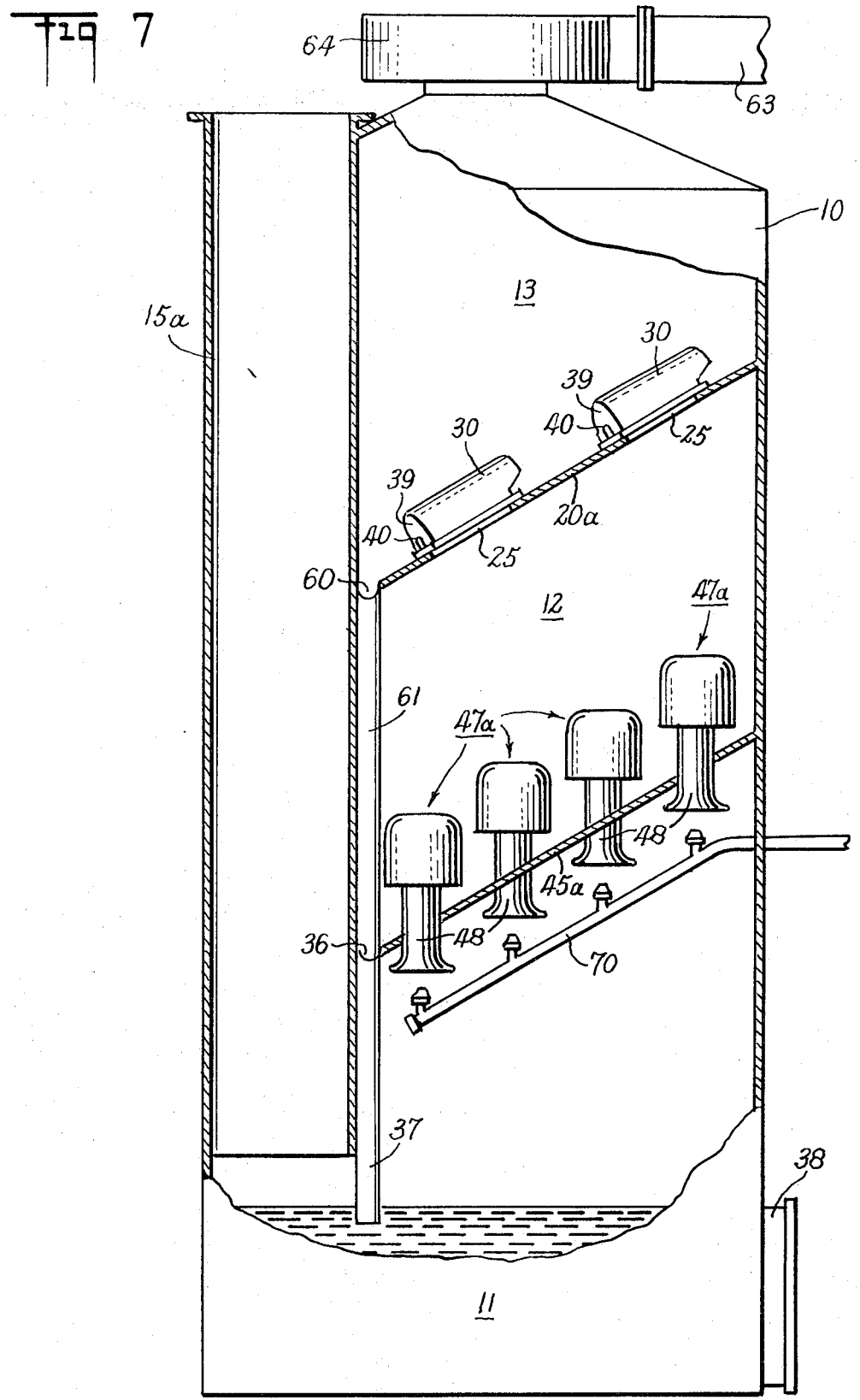
FIG. 7 is a vertical section similar to FIG. 1 but illustrating a further embodiment of the invention.

The embodiment shown in FIG. 7 is generally similar to that above described except that in this form the bonnet type units are disposed in the washing zone and the slot type units are disposed in the drying zone.

The baffle plate 45a and bonnet type units 47a are identical with the plate 45 and units 47 of FIG. 1 and will not be redescribed. In this embodiment the plate 45a is disposed in the washing zone and a central axial spray 70 is disposed at the entrance of each cylinder 48 for producing a conical spray through which the gases pass into the cylinder.

The baffle plate 20a with the slots 25 is disposed in the drying zone. The various parts of FIG. 7 which are identical with those above described have been given the same reference numerals.

The inlet duct 15a is disposed inside of the shell 10 and extends vertically down one side thereof and the baffle plates 20a and 45a are shaped to receive this duct.

It is obvious that the location of the inlet duct may be altered as desired and that the arrangement of FIG. 1 may be used. Also the arrangement of the baffle plates may be varied.

In some instances it may be desirable to utilize units of the same type in both the washing zone and the drying zone. Such an arrangement is shown in FIG. 8 wherein units of the bonnet type are used in both of said zones.

In FIG. 8 the lower baffle plate 45b is similar to the plate 45a of FIG. 7 and carries similar units 47b. The upper baffle plate 45c of FIG. 8 is similar to the plate 45 of FIG. 1. The parts of FIG. 8 which are identical with those of FIG. 1 have been given the same reference numerals.

The inlet duct 15b in FIG. 8 is shown as extending axially in the shell 10 and through the baffle plates 45b and 45c, although its position may be varied and any of the previously described arrangements may be used in this embodiment.

In some instances it may be desired to use units of the slot type as shown in plate 20 of FIG. 1 in both the washing and drying zones. In such case the plate 20a of FIG. 7 may be substituted for the plate 45 of FIG. 1.

In any of the above embodiments the gases are introduced into the washing zone above the reservoir 11 and are caused with a change in direction to pass upwardly through the washing and drying zones. This first change in direction serves to remove larger particles from the gases.

In the washing zone the gases pass through a liquid spray and then through a separator unit wherein the droplets and particulate material are removed by a combination of centrifugal force and inertia which causes the particles to impinge on deflector surfaces and to be removed from the gas stream.

The gases are then dried to remove entrained droplets and fine particulate matter by a further combination of centrifugal force and inertia. The surfaces of the baffle plates are washed as required to remove the deposited matter and liquid into the peripheral channels from whence it drains into the reservoir for removal.

What is claimed is:

1. Apparatus for cleaning gases comprising a vessel having washing and drying means communicating with each other, each of said means including at least one baffle plate having at least one downwardly sloping wall and extending transversely across said vessel and having openings for the passage of said gases, inlet means communicating with said washing means for introducing said gases into the washing means, separator units in registratiOn with each of said openings, one of said separator units including means for separating entrained droplets and particulate matter centrifugally from said gases and having a channel member disposed along one side of each opening having a solid wall adjacent said opening and a curved deflector disposed along the other side of each opening extending over said channel member to form an arcuate path for gases over and around said channel member and on which the heavier components impinge centrifugally as the gases flow through the arcuate passage, said channel having inlet means for receiving separated gas and outlet means for discharging separated gas, a second of said separator units including means for reversing the flow of said gases for effecting additional separation by impingement and having a tube registering with each of said openings and a cap with a depending skirt disposed over the end of each such tube with a central outlet therein, said skirt being spaced from the tube to form an annular gas passage around said tube whereby the gases are reversed in direction to remove material by impingement, and means in said tube for effecting rotation of the gas-liquid mixture, spray means in advance of said baffle plate in said washing means adapted to produce a curtain of spray liquid across said openings and across the path of said gases therein, means for removing the separated liquid and particulate material from said plate, and an outlet communicating with said drying means for removing the cleaned gas.

2. Apparatus as set forth in claim 1 including a reservoir for the separated material in said vessel.

3. Apparatus as set forth in claim 2 including means for draining the separated material into said reservoir.

4. Apparatus as set forth in claim 1 in which the sides of said baffle plate are inclined upwardly for the drainage of liquids toward the periphery thereof.

5. Apparatus as set forth in claim 4 in which said sides are formed by a series of flat plates having slots therein.

6. Apparatus as set forth in claim 5 in which means is provided for the angular adjustment of said slots with respect to the radius of said baffle plate.

7. Apparatus as set forth in claim 5 in which said separator units are mounted on discs carrying said slots and means is provided for rotatably adjusting said discs on said baffle plate.

8. Apparatus as set forth in claim 1 in which vanes are disposed in said tubes to effect rotation of the gases therein for effecting separation by centrifugal force.

9. Apparatus as set forth in claim 8 including means for introducing a spray into said tubes for washing said gases.

10. Apparatus as set forth in claim 1 in which at least one of said baffles includes elongated slots with deflector means and at least one other of said baffles includes a tube with a spaced cap and skirt through which the gases pass with reversal in direction.

11. Apparatus as set forth in claim 10 in which the first mentioned baffle is disposed in the washing zone.

12. Apparatus as set forth in claim 10 in which the last mentioned baffle is disposed in the washing zone.

* * * * *